United States Patent [19]

Stone

[11] Patent Number: 4,539,624

[45] Date of Patent: Sep. 3, 1985

[54] DIFFUSION DEVICE FOR FLASH GUN

[76] Inventor: Kenneth Stone, P.O. Box G, Boulder Creek, Calif. 95006

[21] Appl. No.: 639,690

[22] Filed: Aug. 10, 1984

[51] Int. Cl.³ ............................................. G03B 15/02
[52] U.S. Cl. ....................................... 362/16; 362/17; 362/18; 362/307; 362/341; 362/355; 362/359; 362/396; 362/433; 362/455
[58] Field of Search ...................... 362/16, 17, 18, 433, 362/186, 355, 375, 363, 307, 341, 359, 396, 455

[56] References Cited

U.S. PATENT DOCUMENTS

| | | | |
|---|---|---|---|
| 4,148,094 | 4/1979 | Bennett | 362/292 |
| 4,380,787 | 4/1983 | Stone | 362/16 |
| 4,462,068 | 7/1984 | Shadwick | 362/375 |
| 4,466,050 | 8/1984 | Lockard | 362/375 |

Primary Examiner—Stephen J. Lechert, Jr.
Assistant Examiner—Howard J. Locker
Attorney, Agent, or Firm—Robert G. Slick

[57] ABSTRACT

A diffusion device for a flash gun is provided in the form of a translucent box-like structure which fits on the end of a commercial flash gun. In accordance with one embodiment of the invention, opaque shields are provided for the front and back of the diffusion device which can be selectively added or removed to produce special effects. In accordance with another aspect of the invention, a slot is provided in the top of the diffusion device for retaining a reflector.

4 Claims, 3 Drawing Figures

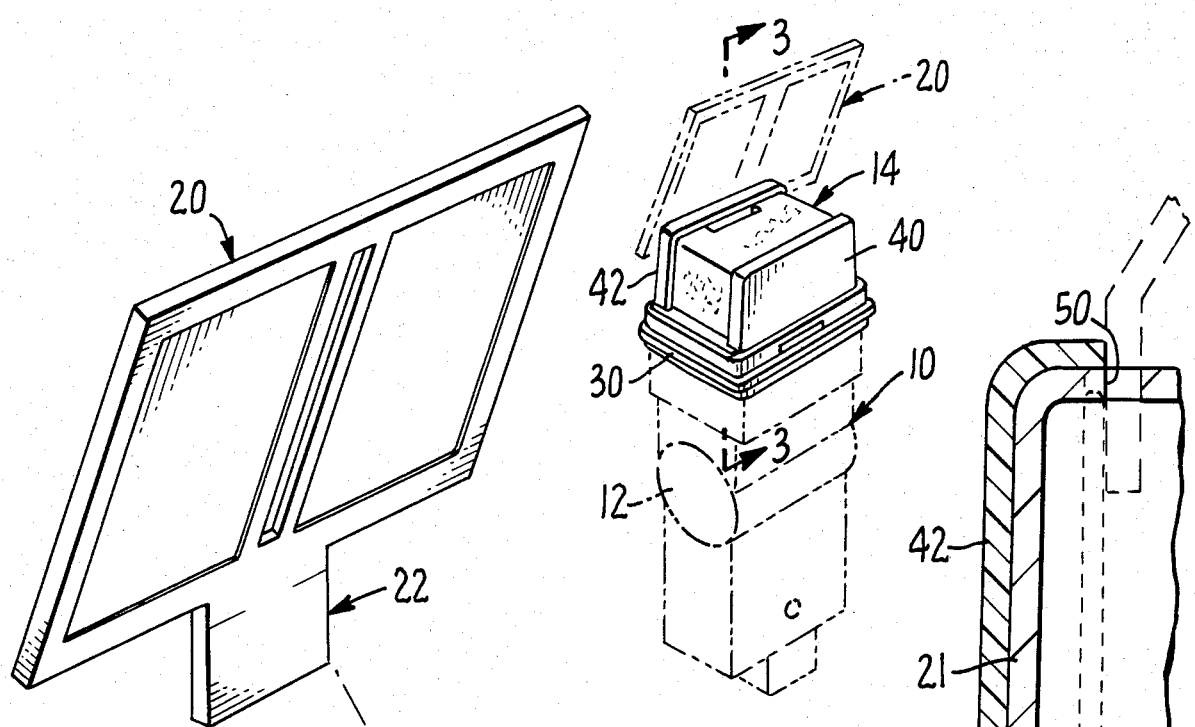
FIG. 1.
FIG. 3.
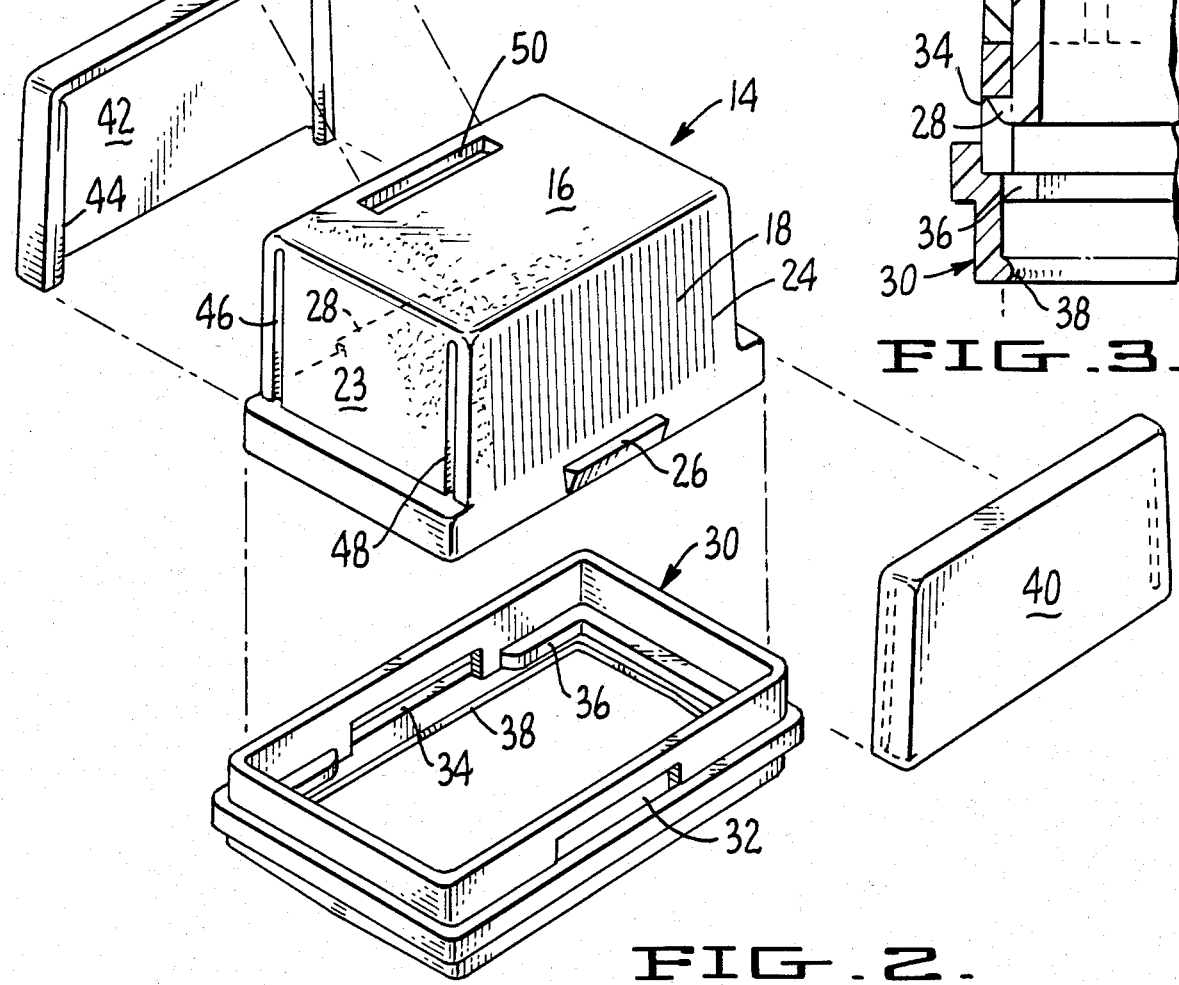
FIG. 2.

DIFFUSION DEVICE FOR FLASH GUN

SUMMARY OF THE INVENTION

The present invention relates to an attachment for flash guns and is an improvement and modification of the devices shown in my prior U.S. Pat. Nos. 4,380,787 and 4,272,169.

The present invention is a diffusion device adapted to be attached to a commercial flash gun having a rectangular opening from which the flash is emitted.

In accordance with the broadest aspect of the present invention, a translucent, box-like member is provided which fits over the end of the flash gun to diffuse the light so that a large area is uniformly flooded without the usual hot spots which are common to many types of flash apparatus.

In accordance with one aspect of the invention, opaque shields are provided which can be selectively attached to the back or the front of the diffusion device so that the light distribution can be varied at will.

In accordance with another aspect of the invention, a slot may be provided in the top of the diffusion device so that a reflector, as fully described in my prior U.S. Pat. No. 4,272,169, may be inserted.

In accordance with another object of the invention, an adaptor is provided enabling the diffusor of the present invention to be utilized with various makes of commercial flash guns.

Other features and advantages of the invention will be brought out in the balance of the specification.

BRIEF DESCRIPTION OF THE DRAWINGS

FIG. 1 is perspective view of a device embodying the present invention showing a flash gun and reflector in phantom.

FIG. 2 is an exploded view of the diffusion device and reflector shown in FIG. 1.

FIG. 3 is a section on the line 3—3 of FIG. 1.

DESCRIPTION OF THE PREFERRED EMBODIMENTS

Referring now to the drawings by reference characters, there is shown a flash gun 10 of a well-known commercial type. The upper surface of the gun 10 is provided with a translucent rectangular window through which light is emitted. The gun is hinged as at 12 so that the light can be emitted in any desired direction such as directly at the subject, straight up or some angle therebetween. A problem with such guns is that the beam of light emitted is frequently very narrow so that the complete subject is not illuminated, particularly when one uses a wide angle lens.

In accordance with the present invention, this is remedied by providing a box-like member generally designated 14 of a translucent material, suitably a plastic, which fits over the light-emitting surface. Member 14 has a top 16, a front 18, a rear surface 21 and ends 23. Preferably the front surface 18 is ribbed as at 24 to give a better distribution of light. In its simplest form for use with certain commercial flash guns, the device may be merely slipped over the end of the flash gun and held in place by means of the ledge 26 in the front surface 18 and ledge 28 in the rear surface 20. However, for the vast majority of flash guns, an adaptor generally designated 30 must be used. The adaptor is rectangular in form and has a front slot 32 and a rear slot 34 to engage the ledges 26 and 28. In addition, the adaptor has an inner rim 36 which fits down over the end of the flash gun and supports the end of the diffusor. In addition, a slight lip 38 is provided at the bottom of the adaptor which enables it to snap onto certain brands of flash gun. Thus, with some brands of flash guns, the diffusor 14 may be used by itself while with others it is necessary to employ the adaptor 30 so that the device is of universal applicability since it will fit substantially any commercial flash gun.

For some special effects, it is desirable to be able to shut off light being emitted from either the front or the back surface or from both the front and back. For this purpose, opaque members 40 and 42 are provided which have inturned ridges as at 44, which snap into slots 46 and 48 on the sides of the diffusor. Similar slots are provided in the opposite wall, not illustrated. Thus, for special effects, either one or both of the opaque members 40 and 42 can be snapped into the diffusor.

At times it is desirable to be able to use a reflector of the type described in my prior patents. For this purpose, a slot 50 is provided in the top surface 16. The reflector 20 has a tongue 22 and this fits into the slot 50 as is shown in phantom in FIGS. 1 and 3.

Many variations can be made in the exact structure shown without departing from the spirit of this invention.

I claim:

1. A diffusion device for a flash gun said flash gun having a rectangular translucent, flat light emitting surface at one end thereof, comprising a box-like member having a top, sides, back and front of a translucent material and an open bottom and having first means for attaching said device to a flash gun with the open bottom adjacent the light emitting surface of the flash gun and having second attachment means for attaching said device to a flash gun, said second attachment means including an adaptor ring having a first surface fitting over the end of a flash gun and a second surface fitting the open end of the diffusion device.

2. The diffusion device of claim 1 wherein the front and back surface are provided with a plurality of lenticular ribs.

3. The diffusion device of claim 1 having opaque means adapted to be detachably mounted on the back and the front thereof.

4. The diffusion device of claim 1 having a slot in the top adapted for the insertion of the tongue of a bounce flash reflector.

* * * * *